United States Patent [19]

Dziak

[11] 4,302,517
[45] Nov. 24, 1981

[54] UNITARY SEAL AND COVER SUPPORT GASKET FOR MINIATURE BUTTON CELLS

[75] Inventor: Theodore P. Dziak, Mentor, Ohio

[73] Assignee: Union Carbide Corporation, New York, N.Y.

[21] Appl. No.: 163,323

[22] Filed: Jun. 26, 1980

[51] Int. Cl.³ .............................................. H01M 2/08
[52] U.S. Cl. ...................................... 429/66; 429/174
[58] Field of Search .............. 429/162, 172, 173, 174, 429/185, 66

[56] References Cited

U.S. PATENT DOCUMENTS

| | | | |
|---|---|---|---|
| 2,626,295 | 1/1953 | MacFarland | 429/66 |
| 3,069,489 | 12/1962 | Carmichael et al. | 136/133 |
| 3,185,595 | 5/1965 | Schenk | 429/174 |
| 3,746,580 | 7/1973 | Asker et al. | 136/86 A |
| 3,897,265 | 7/1975 | Jaggard | 136/86 A |
| 4,041,211 | 8/1977 | Wiacek | 429/36 |
| 4,105,830 | 8/1978 | Kordesch | 429/27 |
| 4,118,544 | 10/1978 | Przybyla et al. | 429/27 |
| 4,137,375 | 1/1979 | Coueille | 429/66 |

FOREIGN PATENT DOCUMENTS 2254888  8/1975  France ................. 429/174

Primary Examiner—Donald L. Walton
Attorney, Agent, or Firm—Cornelius F. O'Brien

[57] ABSTRACT

A miniature button cell employing an insulating seal and cover support gasket which extends within and parallel to the wall of the cell's container and is provided with a plurality of spaced-apart openings or cavities in its wall thereby providing a reservoir for the cell's electrolyte and/or space to accommodate the reaction products of the cell formed during discharge.

8 Claims, 9 Drawing Figures

UNITARY SEAL AND COVER SUPPORT GASKET FOR MINIATURE BUTTON CELLS

FIELD OF THE INVENTION

This invention relates to sealed galvanic cells employing an insulating gasket between the cover and the container of the cell which is composed of a first sealing segment disposed and compressed between the rim of the cover and the edge of the container and a second cover support segment extending within the container and substantially parallel to the wall of the container and defining a plurality of spaced apart openings which accommodate the cell's electrolyte and/or the cell's reaction product.

BACKGROUND OF THE INVENTION

The battery has become a primary power source for many portable electronic devices such as radios, hearing aids, watches, calculators and the like. In order to maintain the overall electronic devices as compact as possible, the electronic devices are usually designed with cavities to accommodate miniature batteries as their power source. The cavities are usually made so that a battery can be snugly positioned therein, thus making electronic contact with appropriate terminals within the device. To accommodate the electronic component manufacturers, the battery industry has adopted several conventional size button cells which the manufacturer can rely upon in designing their devices which require portable power sources. Due to the large number of battery-powered devices on the market, there has been a demand for increased power output capacities of standard size button cells. Accordingly, various anode-cathode couples have been employed so as to provide a sufficient output capacity to operate various devices. A problem has been encountered, however, when the density of the electrode bodies has to be increased in certain cell systems if maximum output power is to be achieved. Consequently, when increasing the density of the electrode bodies, two approaches can be taken; one of which is to maintain the same diameter and reduce the thickness and the other approach is to maintain the same thickness and reduce the diameter. If the diameter is unchanged and the thickness is reduced, an additional provision would have to be made to maintain the same gasket and opposing electrode height while, on the other hand, if the thickness is not changed but the diameter is decreased, a support is definitely needed for the cover. In addition, it was also noted that in certain cell systems it is necessary in order to obtain greater output capacity to add additional electrolyte into the cell. Although the densification of the electrode members would provide additional space for the electrolyte, it would have the disadvantage in that in order to properly seal the cell, it would be necessary to add a support member for the cover of the cell during the sealing operation.

Another major potential problem in certain types of battery power devices is that if the battery bulges, as could occur in miniature alkaline cells, the battery would usually become wedged within the cavity of the device which sometimes can result in damage to the device. One cause of cell bulging or other distortion of the cell's overall physical dimensions is due to the expansion of the cathode and/or formation of reaction products during cell discharge or during abusive discharge conditions.

It is, therefore, an important object of this invention to provide a compact cell structure that employs a gasket performing the dual function of providing the sealing means which is disposed and compressed between the cell's cover and the cell's container while also providing support means for the cover during the sealing operation while additionally providing longitudinal openings as reservoirs for an additional amount of the cell's electrolyte and/or openings which can accommodate any expansion of the cell's components or reaction products during discharge.

Another object of the present invention is to provide a dual sealing and cover support gasket for use in miniature type button cells.

Another object of the present invention is to provide a gasket for miniature type button cells having a first segment which is disposed and compressed between the rim of the cell's cover and the edge of the cell's container and a second segment extending within the container and substantially parallel to the wall of the cell's container and provided with a plurality of spaced-apart openings or cavities to accommodate additional electrolyte for the cell.

Another object of the present invention is to provide a gasket for miniature type button cells having a first segment which is disposed and composed between the rim of the cell's cover and the edge of the cell's container and a second segment extending within the container and substantially parallel to the wall of the cell's container and provided with a plurality of spaced-apart openings or cavities to accommodate any expansion of the cell's components or reaction products during discharge so as to effectively minimize cell distortion.

The following and additional objects will become more fully apparent from the following description and accompanying drawings.

SUMMARY OF THE INVENTION

The invention relates to a galvanic cell having a negative electrode; a positive electrode; a separator between said negative and said positive electrode; and an electrolyte assembled within a two-part conductive housing, the first part of the conductive housing being a cupped container electronically connected to one of the electrodes, the second part of the housing being a cover electronically connected to the other electrode and wherein said first part container and said second part cover are electronically insulated from each other by an insulating sealing gasket disposed between and compressed between the edge of the container and the rim of the cover; the improvement wherein the insulating gasket comprises a first sealing segment disposed and compressed between the rim of the cover and the edge of the container and a second cover support segment which extends within the container and is substantially parallel to the wall of the container and defines a plurality of spaced-apart openings adapted to accommodate the cell's components or the cell's reaction product formed during discharge.

The second cover support segment of the insulating gasket could be provided with a plurality of spaced-apart longitudinal ribs spaced at about 15° to 90° intervals, preferably 45° intervals, which would define an opening between adjacent ribs thus providing an overall plurality of spaced-apart openings. The second cover support segment of the insulating gasket could also be provided with grooves or ridges in the segment which would define the plurality of openings. In addition, the second cover support segment could be composed of extending rod-like members which, in conjunction with the internal wall of the container, could define an opening between two of the extended rod members thereby providing an overall plurality of openings in conjunction with the wall of the container. Each of the plurality of openings defined in the second cover support segment of the insulating gasket could assume any configuration, such as rectangular, circular, semi-circular, square or any polygonal shaped opening or combinations thereof.

In certain cell systems where additional space is provided due to the densification of one or more of the cell's components, such as in a lithium/$FeS_2$ cell system, the insulating gasket could be provided with a radially inwardly disposed flange member between the first sealing segment and the second support segment. In this embodiment, the flange member would provide an axial support for the rim of the cell's cover during the sealing operation. Although radial sealing is primarily employed in the sealing of miniature button cells, in some applications of the radial sealing there is an axial force applied to the edge of the container which is transferred through the first sealing segment of the gasket onto the rim of the cover. If the cover's edge is not properly supported, the rim of the cover could be distorted with reference to the container thereby affecting the overall seal of the cell. In this embodiment employing a radially disposed flange, the second cover support segment of the gasket could be provided with longitudinal ribs which would define a plurality of longitudinal openings or channels. These openings or channels could be used as reservoirs for an additional amount of the cell's electrolyte, thereby providing an adequate amount of the electrolyte in fixed miniature size button cells to insure delivery of a sufficient power output.

In other types of cell systems such as miniature alkaline air cells, the second sealing segment of the insulating gasket could terminate in a radially inwardly disposed flange which would be adapted to rest against the separator of the cell. In this embodiment, the second cover support segment could comprise a plurality of spaced-apart ribs which again would define a plurality of longitudinal openings or channels into which the reaction products of the cell could expand without effectively distorting the cell housing. In some applications it may be desirable to incorporate both the radially disposed flange juxtaposed the first sealing segment and the second support segment of the insulating gasket and the radially disposed flange extending from the end of the second support segment. The particular embodiment to be incorporated will depend primarily on the cell system to be housed within the container. The number of openings provided in the second cover support segment of the gasket could vary depending on the amount of volume required to accommodate the cell's components and/or the cell's reaction products or the support needed to sustain the rim of the cover during the sealing operation of the cell.

The insulating gasket disposed between the cover and the can has to be stable in the presence of the cell components and can be selected from such materials as polytetrafluoroethylene (e.g., "Teflon"), fluorinated ethylene-propylene polymer (e.g., FEP), ethylene copolymer with FEP (e.g., "Tefzel"), polychlorotrifluoroethylene (e.g., "Kel-F"), perfluoro-alkoxy polymer (e.g., PFA), polyvinyl, polyethylene, polypropylene, polystyrene, nylon, etc.

The two-part container housing for the cell could be made of stainless steel, iron, nickel, nickel-plated steel, or some other conductive material that will not corrode or otherwise deteriorate when in contact with the cell materials.

A separator for use in this invention has to be chemically inert and insoluble in the cell system and have a porosity so as to permit the liquid electrolyte to permeate through and contact the electrodes of the cell, thus establishing an ion transfer path between the negative and positive electrodes.

The present invention is ideally suited for use in nonaqueous lithium solid cathode systems such as lithium/$FeS_2$. It is also ideally suited for use in miniature alkaline air cells.

The present invention will become apparent from the following description thereof when considered together with the accompanying drawings which are set forth as being exemplary of the embodiments of the present invention and are not intended, in any way, to be limitative thereof and wherein.

Figure 1:
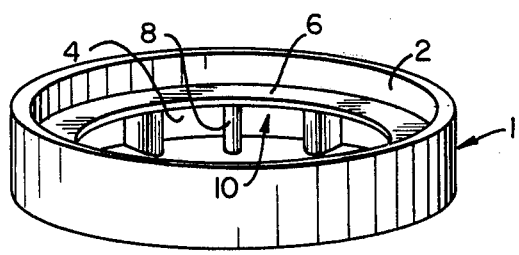
FIG. 1 is a perspective view of a seal and cover support gasket for use in a galvanic cell in accordance with this invention.
Figure 2:
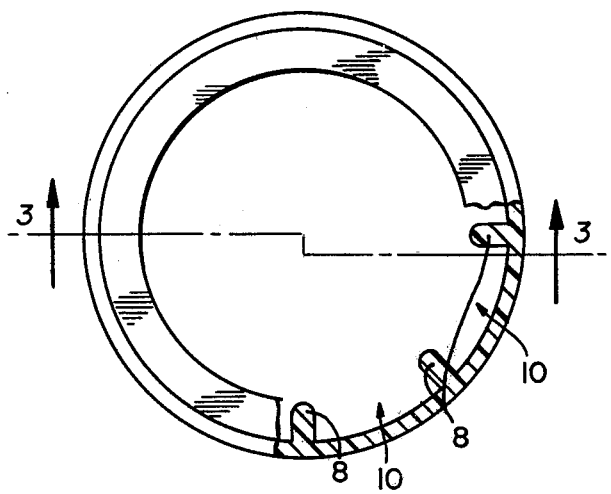
FIG. 2 is a plan view of the seal and cover support gasket of FIG. 1 shown partly in section.
Figure 3:
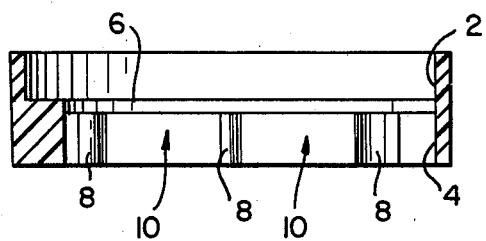
FIG. 3 is a sectional elevational view of the seal and cover support gasket of FIG. 2 taken through line 3—3.

Referring to FIGS. 1 through 3, there is shown a seal and cover support gasket 1 comprising a first seal segment 2 adapted to be disposed and compressed between the rim of a cell container and the edge of a cell cover, and a second support segment 4 extending from segment 2 and adapted to extend within the container and be substantially parallel to the wall of the cell's container. At the junction between the first segment 2 and the second segment 4 is a radially inwardly disposed flange 6 onto which the rim of the cell's cover can rest during the sealing operation of the cell. Disposed circumferentially inwardly of the second support segment 4 are spaced-apart ribs 8 at 45° spacings. As evident from FIGS. 1 through 3, two adjacent inwardly projected ribs 8 form opening 10 which can be used to accommodate additional electrolyte for the cell and/or a space into which the reaction products of the cell can expand. As shown in FIGS. 1 and 2, the spaced-apart ribs 8 will provide a plurality of circumferential openings 10 in the gasket 1.

Figure 4:
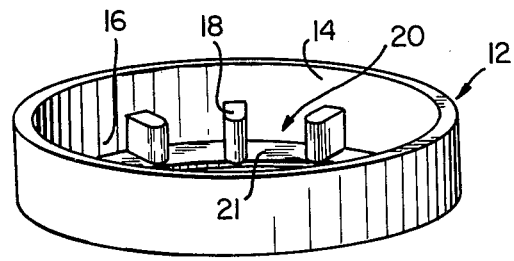
FIG. 4 is a perspective view of another embodiment of a seal and cover support gasket for use in galvanic cells in accordance with this invention.
Figure 5:
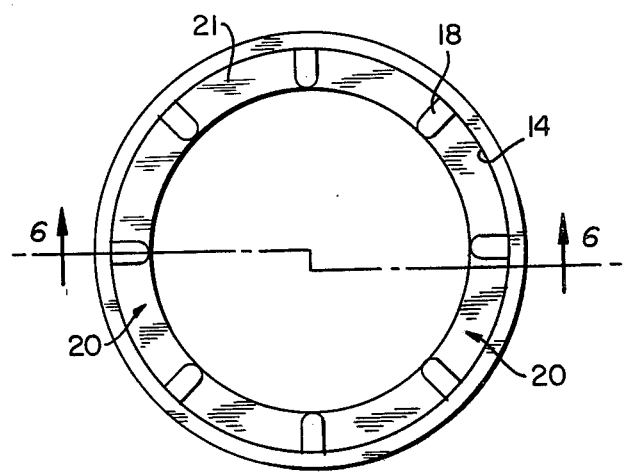
FIG. 5 is a plan view of the seal and cover support gasket of FIG. 4.
Figure 6:
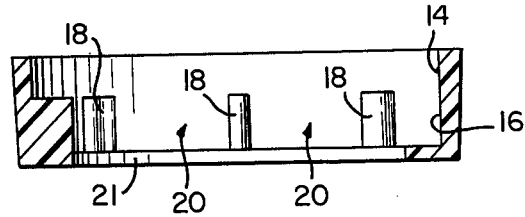
FIG. 6 is a sectional elevational view of the seal and cover support gasket of FIG. 5 taken through line 6—6.

FIG. 4 shows another embodiment of a seal and support gasket 12 having a first seal segment 14 adapted to be disposed and compressed between the cell's cover and the cell's container and having extending therefrom a second support segment 16 adapted to extend within the container and be substantially parallel to the wall of the container. As shown in FIGS. 4 through 6, the second support segment has spaced-apart radially inwardly disposed ribs 18, each of which is disposed at 45° intervals. As evident from FIGS. 4 through 6, two adjacent spaced-apart ribs 18 provide an opening 20 into which the cell's electrolyte can be placed or to accommodate the reaction products formed during discharge of the cell. Terminating at the end of the second support segment 16 is an inwardly disposed flange 21 which is adapted to rest upon the bottom surface of the cell's container or a component of the cell's system such as the separator. Although the ribs 8 and 18 in FIGS. 1 through 6 have been shown placed at 45° intervals, it is also possible to increase or decrease the number of ribs by any desirable number as long as adjacent ribs provide an opening or cavity into which the cell's electrolyte can be stored and/or the reaction product of the cell can expand. Although not shown, it is also possible to incorporate the flange 6 shown in FIG. 1 onto the gasket 12 shown in FIG. 4. It should be noted that whether or not a flange 6 of the type shown in FIG. 1 is incorporated into the seal and support gasket 12 of FIG. 4, the radially inwardly projected ribs 18 would provide a support onto which the rim of the cell's cover can rest during the sealing operation of the cell.

Figure 7:
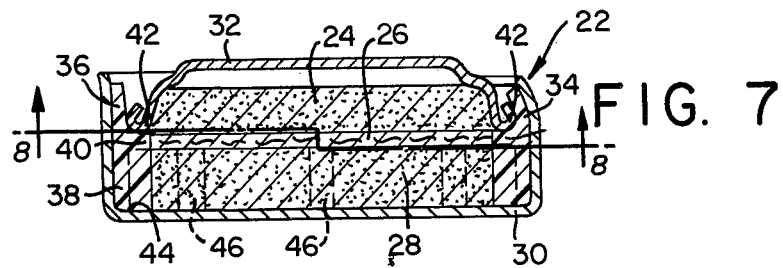
FIG. 7 is a sectional elevational view taken through a partially assembled button cell showing the seal and cover support gasket of FIG. 1 assembled in a cell.
Figure 8:
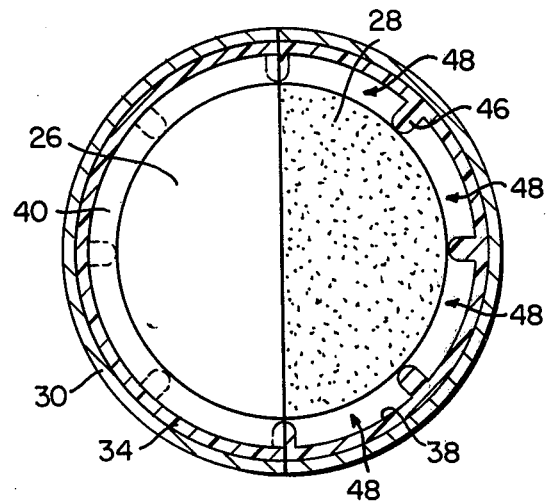
FIG. 8 is a plan view of the partially assembled button cell of FIG. 7 taken through line 8—8.

Referring to FIGS. 7 and 8, there is shown a partially assembled sectional elevational view and plane view, respectively, of the cell 22 having a negative electrode 24, a separator 26 and a positive electrode 28 housed within a two-part assembly comprising a container 30 and a cover 32. Disposed between the cover 32 and the container 30 is a seal and support gasket 34 of the general type disclosed in FIG. 1. Specifically, seal and support gasket 34 comprises an upper sealing segment 34 extending into a support segment 38 which is disposed substantially parallel to the wall of the container 30. Disposed juxtaposed the first and second segments of the gasket 34 is an inwardly disposed flange 40 onto which the rim of the cover 42 rests. Note that the support segment 38 of the gasket 34 extends and rests upon the bottom surface 44 of the container 30. The left half of the cell 22 is shown just prior to sealing the cell. Specifically it is noted that the wall of the container extends upright and adjacent to the seal segment 36 of the gasket 34 which rests against the rim 42 of the cover 32. During the sealing operation, the upper edge of the container 30 is radially compressed inwardly providing a radial seal as generally disclosed in U.S. Pat. No. 3,069,489. While the U-shaped rim 42 of cover 32 is resting on flange 40, the top edge of the container is crimped over the seal and support gasket 34 thereby effectively sealing the cell as can be shown in the right half of button cell 22 in FIG. 7. During the sealing operation, the U-shaped rim 42 rests upon the flange 40, thus providing sufficient support for the cover during the sealing operation. The use of this dual function sealing and cover support gasket eliminates the necessity for having a separate cover support gasket for the button cells of the type described. As shown in FIGS. 7 and 8, the support segment 38 of the gasket 34 has radially inwardly projected ribs 46 disposed at 45° intervals such that each pair of adjacent ribs 46 provide an opening 48. Openings 48 are disposed circumferentially around the support segment 38 of gasket 34. In this type of cell system the openings 48 can be employed as reservoirs into which a sufficient amount of the cell's electrolyte can be added.

Figure 9:
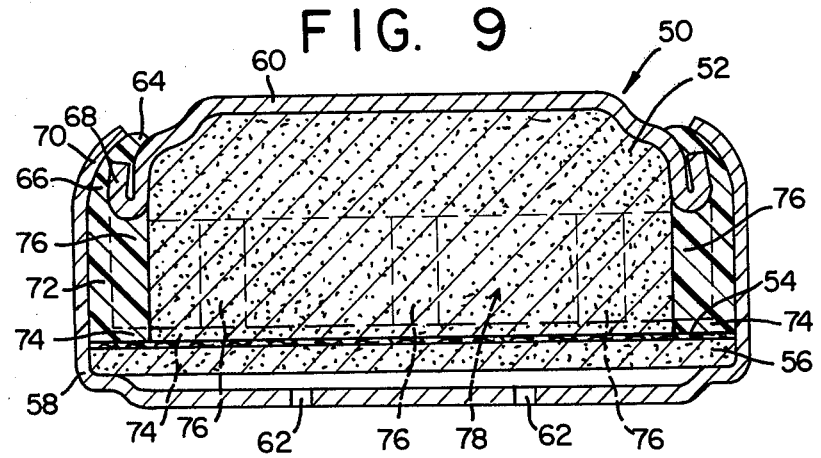
FIG. 9 is a sectional elevational view taken through an assembled button cell showing the seal and cover support gasket of FIG. 4 assembled in a cell.

FIG. 9 shows a typical miniature alkaline air cell 50 having a negative electrode 52, a separator 54 and a positive electrode 56 housed in a two-part assembly comprising a container 58 and a cover 60. The bottom of the container 58 is equipped with openings 62 to permit the ingress of air. Disposed between the cover 60 and the container 58 is a seal and support gasket 64 of the type shown in FIG. 4. Specifically, the seal and support gasket 64 comprises a first seal segment 66 which is disposed and compressed between U-shaped rim 68 of cover 60 and the edge 70 of container 58. Extending from the first segment 66 of the gasket 64 is the second support segment 72 which is disposed parallel to the inner wall of the container 58 and terminates in an inwardly disposed flange 74. The second support segment 72 and the inwardly disposed support flange 74 rest and are supported on separator 54. Projecting from the second support segment 72 are radially disposed ribs 76 (some of which are shown in dotted outline) disposed at 45° intervals as basically shown in FIG. 4. As shown in FIG. 9, the U-shaped rim 68 of cover 60 rests upon the spaced-apart ribs 76 which supply support for the cover 60 during the sealing operation of the cell. Flange 74, shown in broken lines in FIG. 9 and corresponding to the flange 21 of FIG. 4, rests against the separator 54 of the cell and provides sufficient support for the ribs 76 for maintaining stability of the cover of cell 50 during cell assembly and sealing. Disposed between each set of adjacent ribs 76 is opening 78 (as basically shown in FIGS. 4 through 6 as openings 20). All of the openings 78 are adapted to accommodate the expansion of any of the cell's components and/or the reaction products formed during cell discharge.

EXAMPLE 1

Several miniature button cells, 0.450 inch diameter and 0.160 inch height, of the type shown in FIG. 7 were produced using a lithium anode disc, a bonded cathode mix of $FeS_2$ as the active cathode material and a nonaqueous electrolyte consisting of a mixture of 30 volume percent dimethoxyethane (DME), 30 volume percent 3-methyl-2-oxazolidone (3Me2Ox) and 40 volume percent dioxolane containing 1 M $LiCF_3SO_3$ as the solute. These components were assembled in the cell as shown in FIG. 7 along with a polypropylene separator and a nylon gasket of the type shown in FIGS. 1 through 3. The anode cup was nickel-plated stainless steel and the cathode container was nickel-plated steel. The density of the $FeS_2$ cathode was increased, thereby providing space between the wall of the container and the peripheral edge of the cathode. The ribs in the nylon gasket were juxtaposed the densified $FeS_2$ cathode and, between adjacent ribs of the gasket, an opening was defined. Some of the electrolyte of the cell was incorporated into these openings, providing an electrolyte reservoir. The cell was then sealed in a conventional manner and upon inspection, the seals were found to be of excellent quality and showed no sign of leakage. The cells were discharged on a 15 K-ohm load test at 35° C. and delivered an average of about 103-mAh service per cell. This test showed that excellent output capacity can be obtained by using the dual function seal and support gasket of this invention because it permitted additional electrolyte to be incorporated into a fixed size button cell.

EXAMPLE 2

Several miniature alkaline zinc air test cells were constructed as basically shown in FIG. 9. Each cell (0.205 inch height and 0.450 diameter) contained 0.730 gram of zinc powder gel mixture (about 8 N KOH containing mercuric oxide and gelled with carboxymethyl cellulose) and a carbon cathode layer (0.018 inch thick and 0.432 inch in diameter) made of 40 weight percent Teflon binder, 35% activated carbon, 20% acetylene black and 5% $MnO_2$. The separator member consisted of 3 layers with a first layer of polyvinyl acetate, a second layer of cellulose and a third layer of another cellulose material. The cathode container was made of nickel-plated cold-rolled steel and the anode cover was made of copper-clad nickel having a gold flash on its entire exterior surface. The seal and support gasket disposed between the container and the cover was the type shown in FIGS. 4 through 6. Specifically, the gasket had a lower flange which was supported on a separator and spaced-apart ribs which supported the U-shaped rim of the cover. Upon assembly of the cell, the spaced-apart ribs of the gasket provide openings of the type shown in FIG. 4 and identified as 20. The cells were discharged across a 625 K-ohm load resulting in an average of about 260 mAH service per cell. Upon inspection, none of the cells showed any housing distortion, thereby indicating that the expansion of the reaction products during discharge was accommodated in the openings provided between adjacent ribs on the seal and support gasket.

What is claimed is:

1. A galvanic cell having a negative electrode; a positive electrode; a separator between said negative and said positive electrode; and an electrolyte assembled within a two part conductive housing, the first part of the conductive housing being a cupped container electronically connected to one of the electrodes, the second part of the housing being a cover electronically connected to the other electrode and wherein said first part container and said second part cover are electronically insulated from each other by an insulating sealing gasket disposed between and compressed between the edge of the container and the rim of the cover; the improvement wherein the insulating gasket comprises a first sealing segment disposed and compressed between the rim of the cover and the edge of the container and a second support segment which extends within the container and is substantially parallel to the wall of the container and defines a plurality of spaced-apart openings adapted to accommodate the cell's components or the cell's reaction product formed during discharge.

2. The galvanic cell of claim 1 wherein the second support segment of the gasket has a plurality of spaced-apart longitudinal ribs that define the plurality of openings.

3. The galvanic cell of claim 1 wherein the gasket has a radially inwardly disposed flange between the first sealing segment and the second support segment of the gasket to aid in supporting the rim of the container.

4. The cell of claim 1 wherein the second support segment of the gasket extends to the bottom of the container.

5. The cell of claim 1, 2 or 3 wherein the second support segment of the gasket terminates with a radially inwardly disposed flange.

6. The cell of claim 1, 2, 3 or 4 wherein the second support segment of the gasket extends within the cell and rests on the cell's separator.

7. The cell of claim 2 wherein the spaced-apart longitudinal ribs are spaced at intervals of between 15° to 90°.

8. The cell of claim 2 or 7 wherein the spaced-apart longitudinal ribs are spaced at 45° intervals.

* * * * *